United States Patent Office

2,967,780
Patented Jan. 10, 1961

2,967,780

SUPERSULFATE CEMENT SLAG ACTIVATOR

Henry James Schneiter, Grand Island, and Kenneth F. Smith, Buffalo, N.Y., assignors to National Gypsum Company, Buffalo, N.Y., a corporation of Delaware No Drawing. Filed Dec. 23, 1958, Ser. No. 782,398

1 Claim. (Cl. 106—109)

The present invention relates to the improvement of the compressive strengths of supersulfate cement, and particularly to an air cooled slag additive for improving high early strength of supersulfate cement with optimum ultimate strength.

Supersulfate cements are a class of hydraulic cements which are comprised principally of a mixture of 75% to 95% ground granulated blast furnace slag and 5% to 25% gypsum, the gypsum being either natural anhydrite, manufactured anhydrite, di-hydrate or hemi-hydrate gypsum or mixtures thereof. Supersulfate cements are, thus, a form of hydraulic cement, clearly distinct from other hydraulic cements in chemical composition and ultimate characteristics, noted particularly for high specific impermeability and chemical imperviability.

A particular problem recognized in supersulfate cements is the relatively slow reactivity and the consequent low early strength of the concrete formed therefrom. The prior use of about 0.5% to 1% by weight of Portland cement is known to improve the initial reactivity and the early strength of supersulfate cement, but to also decrease the ultimate or final strength of the concrete.

It is an object of the present invention to provide a novel activator for supersulfate cement to increase substantially the early strength of supersulfate cement, and to provide such increase with a subsequent substantial increase also in the ultimate strength of the cement. Briefly, the invention consists of a supersulfate cement consisting essentially of the mixture of from 75% to 95% ground granulated blast furnace slag and from 5% to 25% gypsum, and having in addition thereto from 0.5% to 2% of an activator consisting of ground air cooled slag.

NOVEL ACTIVATOR

The novel activator of the present invention is ground air cooled slag. This is a distinctly different material from the ground granulated blast furnace slag which is the main ingredient of the supersulfate cement, in that, as is well known in the trade, granulated slag is water quenched by a stream of water as it is being discharged from a blast furnace and immediately falls into a water tank, whereas air cooled slag is discharged, in a molten condition, into a dry receiving means, to harden and air cool. Whereas the granulated slag is a relatively crystalline material, the air cooled slag is a glassy material of clearly different structure and characteristics. The air cooled slag is a far more difficult material to grind to fine particle size, and although it is desirable that the air cooled slag prepared for use in accordance with the invention be reduced to a particle size substantially equal to the particle size of the basic ingredients of the cement, as discussed further below, the greater difficulty in grinding makes it preferable to employ a fineness of the air cooled slag slightly coarser than the fineness of the basic ingredients, namely, a fineness of air cooled slag such that it has a Blaine specific surface of about 3500 sq. cm. per gram.

NOVEL SUPERSULFATE CEMENT

An activator prepared in accordance with the above-said preferred form is formulated into a supersulfate cement dry mix, substantially as follows:

| | Percent |
|---|---|
| Ground granulated blast furnace slag | 84 |
| Dead burnt gypsum | 9 |
| Raw gypsum | 6 |
| Ground air cooled slag activator | 1 |

In accordance with prior practices, the granulated slag and gypsum components of supersulfate cements are known to be relatively variable within proportions of 75% to 95% ground granulated blast furnace slag to 5% to 25% gypsum. The proportion of air cooled slag activator of the above formulation may be varied in accordance with the invention from 0.5% to 2% of the total granulated slag and gypsum weight.

The gypsum may consist of manufactured anhydrite, such as dead burnt dihydrate gypsum, natural anhydrite, dihydrate or hemi-hydrate gypsum or combinations thereof.

The chemical composition of both the granulated and air cooled slags is substantially as follows:

| | Percent |
|---|---|
| CaO | 40.00–50.00 |
| SiO$_2$ | 30.00–40.00 |
| Al$_2$O$_3$ | 8.00–14.00 |
| MgO | maximum 7.00 |
| Fe$_2$O$_3$ | do 0.80 |
| S | do 1.75 |
| Mn | do 1.50 |

The method of preparing and mixing the components of the cement embodying the invention is variable generally in accordance with common methods of preparing and mixing prior supersulfate cements. The preferred method consists of grinding separately the several ingredients in a dry ball mill to fineness such that the materials other than the activator have a Blaine specific surface of from 4500 to 5500 sq. cm. per gram, as determined in accordance with A.S.T.M. Standard Method of Test, Designation C204–55. While the activator is, for economy, ground less fine, as discussed further above. The ingredients are then added together and further ground in a ball mill only sufficiently to provide a substantially complete and thorough mixing, without substantial further reduction in particle size.

The cement may alternatively be prepared by adding the raw components together before grinding and then reducing the mixture in particle size by dry ball milling to a fineness substantially as above. Either of these two methods may also be altered to a reduction to the desired particle size by jet pulverizing rather than ball milling.

COMPRESSIVE STRENGTHS

To provide a basis of comparison of characteristics of the novel activator and the resultant supersulfate cement made therefrom, the compressive strengths, at 1 day, 3 days, 7 days and 28 days is set forth herebelow along with the compressive strengths of supersulfate cement having (a) no activator, (b) 0.5% Portland cement activator, and (c) 1.0% Portland cement activator.

The formulations of these supersulfate cements, not in accordance with the invention are:

(a) *No activator*

| | Percent |
|---|---|
| Ground granulated blast furnace slag | 85 |
| Dead burnt gypsum | 9 |
| Raw gypsum | 6 |

(b) 0.5% Portland cement activator

| | Percent |
|---|---|
| Ground granulated blast furnace slag | 84.5 |
| Dead burnt gypsum | 9 |
| Raw gypsum | 6 |
| Portland cement | 0.5 |

(c) 1.0% Portland cement activator

| | Percent |
|---|---|
| Ground granulated blast furnace slag | 84 |
| Dead burnt gypsum | 9 |
| Raw gypsum | 6 |
| Portland cement | 1 |

The compressive strengths in pounds per square inch of three samples of each of the above prior supersulfate cements and the novel supersulfate cement, at each of the four time intervals, are as follows:

(a) NO ACTIVATOR

| 1 day | 3 days | 7 days | 28 days |
|---|---|---|---|
| 568 | 2,170 | 3,200 | 4,375 |
| 555 | 2,090 | 3,188 | 4,425 |
| 553 | 2,113 | 3,181 | 4,438 |

(b) 0.5% PORTLAND CEMENT ACTIVATOR

| 1 day | 3 days | 7 days | 28 days |
|---|---|---|---|
| 1,310 | 2,150 | 2,993 | 4,025 |
| 1,303 | 2,150 | 2,860 | 3,900 |
| 1,285 | 2,165 | 3,075 | 4,025 |

(c) 1.0% PORTLAND CEMENT ACTIVATOR

| 1 day | 3 days | 7 days | 28 days |
|---|---|---|---|
| 1,235 | 2,087 | 2,600 | 3,400 |
| 1,215 | 1,978 | 2,525 | 3,425 |
| 1,233 | 2,005 | 2,495 | 3,375 |

(d) 1.0% NOVEL ACTIVATOR (GROUND AIR COOLED SLAG)

| 1 day | 3 days | 7 days | 28 days |
|---|---|---|---|
| 948 | 2,458 | 3,725 | 5,338 |
| 960 | 2,458 | 3,750 | 5,388 |
| 965 | 2,393 | 3,750 | 5,587 |

The above compressive strength results were all obtained in accordance with A.S.T.M. Tentative Method of Test for Compressive Strength of Hydraulic Cement Mortars (using 2 inch cube specimens) A.S.T.M Designation: C109-54T, issued 1954. Accordingly, the strengths are the compressive strength in pounds per square inch of a two-inch cube of set cement formed from 1 part by weight of the respective dry cement mixes, 2.75 parts by weight of sand as specified and sufficient water as specified. A summary of the averages of the above strengths is as follows:

| | 1 day | 3 days | 7 days | 28 days |
|---|---|---|---|---|
| No activator | 559 | 2,124 | 3,190 | 4,412 |
| 0.5% Portland cement | 1,300 | 2,155 | 2,976 | 3,983 |
| 1.0% Portland cement | 1,228 | 2,023 | 2,540 | 3,400 |
| 1.0% Novel Activator | 958 | 2,436 | 3,742 | 5,438 |

From the above comparison, it will be seen that an improved supersulfate cement is provided in accordance with the invention, having a substantial early strengthening effect in one day, and an even greater ultimate strengthening effect, in contradistinction from the ultimate weakening effects of the best prior activator.

Although the exact nature of the manner in which the activators function is not known, it appears clear that a markedly different form of activator is provided since it is known that the prior Portland cement activator does react on addition of water, whereas the novel air cooled slag activator is substantially inert insofar as further addition of water. Thus, the prior activator may be considered a seeding agent, whereas the improved novel activator of the present invention is essentially a catalyst.

Having completed a detailed disclosure of the preferred embodiments of our invention so that those skilled in the art may practice the same, we contemplate that variations may be made without departing from the essence of the invention or the scope of the appended claim.

We claim:

An improved supersulfate cement consisting essentially of a mixture of from 75% to 95% finely ground granulated blast furnace slag and from 5% to 25% finely ground gypsum, said granulated blast furnace slag and said gypsum being of a fineness such that the Blaine specific surface thereof is at least 4500 square centimeters per gram, and from 0.5% to 2.0%, based on the weight of said mixture, of an activator, said activator consisting essentially of finely ground air cooled slag, said air-cooled slag being of a fineness such that the Blaine specific surface thereof is at least about 3500 square centimeters per gram.

References Cited in the file of this patent

UNITED STATES PATENTS

| 1,837,072 | Sassur | Dec. 15, 1931 |
| 2,721,805 | Burke | Oct. 25, 1955 |

FOREIGN PATENTS

| 513,900 | Great Britain | Oct. 25, 1939 |

UNITED STATES PATENT OFFICE
CERTIFICATE OF CORRECTION

Patent No. 2,967,780                January 10, 1961

Henry James Schneiter et al.

It is hereby certified that error appears in the above numbered patent requiring correction and that the said Letters Patent should read as corrected below.

Column 1, lines 59 and 60, for "relatively crystalline" read -- glassy --; line 60, for "glassy" read -- relatively crystalline --.

Signed and sealed this 3rd day of October 1961.

(SEAL)
Attest:

ERNEST W. SWIDER
Attesting Officer

DAVID L. LADD
                                                    Commissioner of Patents